United States Patent [19]

Berglund et al.

[11] Patent Number: 6,079,026
[45] Date of Patent: Jun. 20, 2000

[54] UNINTERRUPTIBLE MEMORY BACKUP POWER SUPPLY SYSTEM USING THRESHOLD VALUE OF ENERGY IN THE BACKUP BATTERIES FOR CONTROL OF SWITCHING FROM AC TO DC OUTPUT

[75] Inventors: Neil Clair Berglund, Kasson; Thomas David Roettger, Rochester, both of Minn.

[73] Assignee: International Business Machines Corporation, Armonk, N.Y.

[21] Appl. No.: 08/988,553

[22] Filed: Dec. 11, 1997

[51] Int. Cl.[7] .................................. C06F 1/30; C06F 1/26
[52] U.S. Cl. .............................. 713/340; 307/64; 307/66; 700/293; 713/300; 364/528.32
[58] Field of Search ............................. 395/750; 713/324, 713/300, 321, 322, 340; 364/528.28, 528.32; 307/66, 64; 363/41; 365/228; 714/14, 22

[56] References Cited

U.S. PATENT DOCUMENTS

| | | |
|---|---|---|
| 4,860,185 | 8/1989 | Brewer et al. ............................. 363/41 |
| 5,295,078 | 3/1994 | Stich et al. .......................... 364/528.32 |
| 5,396,637 | 3/1995 | Harwell et al. .......................... 365/228 |
| 5,781,448 | 7/1998 | Nakamura et al. ................. 364/528.28 |
| 5,793,124 | 8/1998 | Mitzaki ....................................... 307/66 |
| 5,802,379 | 9/1998 | Boatwright et al. ..................... 713/324 |
| 5,872,984 | 2/1999 | Berglund et al. .................. 395/750.08 |

Primary Examiner—John A. Follansbee
Assistant Examiner—Walter Benson
Attorney, Agent, or Firm—Christopher H. Lynt

[57] ABSTRACT

A backup power system includes continuously powered memory (CPM) backup functionality integrated with uninterruptible power supply (UPS) backup functionality, for use with a computer system. Battery energy level is monitored to detect when a threshold energy level is reached. The threshold level is an energy level required to ensure a successful CPM backup operation. When a utility power interruption is detected, if the battery energy level is above the threshold, UPS operation is provided. When battery energy level reaches the threshold, CPM operation is provided.

15 Claims, 4 Drawing Sheets

UNINTERRUPTIBLE MEMORY BACKUP POWER SUPPLY SYSTEM USING THRESHOLD VALUE OF ENERGY IN THE BACKUP BATTERIES FOR CONTROL OF SWITCHING FROM AC TO DC OUTPUT

CROSS-REFERENCE TO RELATED APPLICATION

The present application is related to application Ser. No. 08/831,345, now U.S. Pat. No. 5,872,984 entitled "UNINTERRUPTIBLE POWER SUPPLY PROVIDING CONTINUOUS POWER MAINSTORE FUNCTION FOR A COMPUTER SYSTEM " filed Apr. 1, 1997, by Neil C. Berglund, Thomas D. Roettger, and Jan D. Smid, docket number RO997-043, assigned to International Business Machines Corporation.

FIELD OF THE INVENTION

The present invention relates to power systems, and in particular, to a continuously powered backup power system integrated with an uninterruptible power supply (UPS) for use with a computer system, for example.

BACKGROUND INFORMATION

Stand alone uninterruptible power supplies (UPSs) have been used on many known computer systems, such as the IBM AS/400 (IBM and AS/400 are registered trademarks of International Business Machines Corporation). UPS systems available in the industry typically provide backup power to computer systems by running an inverter on batteries to generate AC power. These systems typically also provide the ability to communicate certain status and control information with the systems they backup via an interface. The interface may be used to determine the operational status of the UPS which may include an estimate of the remaining run time left before the energy stored in the battery is depleted and the AC output is turned off, i.e., a so-called "fuel gauge" indication. The fuel gauge information may or may not be of use to the system receiving backup power, depending on the application of the system. For instance, if the time required to restart the system after a power loss is not significant, either because the restart time is short or because no data is lost, for example, then that application may have no use for a prediction of run time remaining.

On the other hand, if the time to restart the system is large and/or a data loss exposure exists, then it is generally understood that it would be beneficial to bring the system to a controlled stop before backup power is lost, because doing so may minimize the time to restart the system, for example.

In the past, a simple "contact closure" interface has been used to communicate status information from the UPS to the computer system, e.g., an IBM AS/400. In addition, the necessary software to control system operation during a utility failure was used to provide backup support. This contact closure interface is also referred to herein as the "9-pin" interface, which refers to the size of the connector (9 pin D shell) but not the number of signals as seen below. A typical pin-out for this interface would include the following:

pin 5-ground
pin 6-UPS BYPASS ACTIVE
pin 7-UPS BATTERY LOW
pin 8-UPS ON
pin 9-UPS UTILITY FAILURE The status signal "UPS UTILITY FAILURE" indicates to the computer system that the UPS is operating on batteries. Note that this 9-pin interface does not have the sophistication of reporting how long the batteries will be able to support the system load, i.e., the fuel gauge function. However, this capability was approximated through system parameters that the user can set to control system operation during a utility failure.

One of these system parameters is called "qupsdlytim" representing UPS delay time. This value, selected by the user, controls the amount of time the computer system will continue normal data processing before it starts a controlled shutdown. If utility power returns before this delay expires, the system operation continues normally. If the delay expires before utility power returns, then an irreversible shutdown process is started. Note that the user computes the amount of time it will take to complete a controlled shutdown, adds this to the run time desired and buys a UPS that supports that total time. The time required to shutdown the system in a controlled manner depends on the application, the size of memory, the number of disk arms, and other variables. Of course, UPS cost increases with support time required, but an underestimation could mean that a controlled shutdown may not complete, and a long restart will be experienced as a result. Furthermore, the calculation is only valid if the UPS batteries are fully charged and the load on the UPS is known. Consequently, if the system was subject to repeated outages without sufficient time to recharge the batteries, the calculations will be inadequate and the controlled shutdown may not complete. Therefore, a conservative approach to this calculation is used.

While the "UPS utility failure" signal, indicating battery operation of the UPS is obviously an important signal, any change of state of any of the interface signals can be detected and reported to the operating system support for possible action. These state changes may cause the generation of messages to a user specified queue, for example, so that user implemented routines can be kicked off and/or appropriate remedial action taken based on these messages.

For example, if a UPS goes off line for service, the user provided support routines may deactivate certain critical processing jobs that are risky to have running when the backup power system is unavailable. This kind of standard UPS support has been integrated into computer systems, such as certain models of the AS/400.

Of course, as the size, performance, and complexity of computers increases, the time to perform an orderly shut down of the computer after a utility failure is detected increases and the power requirements also increase. To ameliorate this and protect purchasers of the computer systems from the possible adverse consequences of a power failure, an integrated backup capability was built-in to certain models of the AS/400. This integrated backup system was designed to protect those users who choose not to purchase external UPS protection, and those users who did purchase an external UPS but wanted in addition an integrated failsafe CPM backup mechanism.

This integrated backup system was designed to power only the memory because the time for a complete shut down in systems with a large amount of memory was too long for the batteries that could be built-in to the computer system enclosure. This backup mechanism was therefore designed to a fixed, not customer alterable, 2 minutes for "ride-through" and CPM (continuously powered memory or continuous power mainstore) shutdown preparation time, followed by up to 48 hours of power for the memory only. The ride through time is a period of time during which the system continues to operate in anticipation that the utility power failure is temporary and can be ridden through until utility power is restored.

In a CPM shutdown, there is no time to write the changed contents of a mainstore memory to disk storage, so the contents of memory are preserved by continuously powering the memory. However, as mentioned, because the batteries for this integrated backup system had to fit in the computer system enclosure, the energy capacity was fixed by design, and thus there was no user control of the so-called ride-through time. This CPM backup support was automatic and worked without any user intervention.

However, as mentioned above, in addition to this integrated support, the computer system user might still want to purchase a UPS system to provide additional protection, e.g., to provide in addition the standard UPS backup ride through time before the CPM backup mechanism was initiated. Therefore, UPS status was still provided for through the 9 pin interface, as described above, while status from the internal integrated backup system was provided via unique signals so that the software support in the operating system could differentiate between status provided by the UPS from status provided by the integrated backup system. The signals from the integrated internal backup system are considered to be more important by the computer operating system, since they may be occurring because the batteries in the UPS, if present, have been exhausted, for example, and CPM backup needs to be started. Thus, in such a system with both UPS and integrated CPM backup, the processing for the integrated CPM backup system preempted any computer system processing related to the UPS backup.

The integrated backup system was later implemented as a custom modification of an industry UPS system, leading to the so called "26-pin" interface which is described in the copending patent application referenced earlier. It should be noted that this custom modification, or "under the covers" system as it is also referred to herein, provides the integrated CPM backup system functions, but does not provide a traditional UPS functionality.

The under the covers system was sized to provide 2 minutes of run time at normal system load while the system is prepared for CPM. Then the system is turned off and only memory remains powered, for up to 48 hours more. The standard 9-pin interface for connection to an external standard industry UPS is still available to a user, if the user desires more protection than is provided by this under the covers integrated CPM support, with the 9-pin interface functions as were already described above. That is, the additional ride through time, for example, that the standard UPS can provide before CPM backup processing is begun.

As should be apparent from the above, leading to the development of the under the covers CPM backup system, which is the subject of the copending application referenced above, was the problem that as memory capacities of many computer systems grow, typical traditional UPS hold-up times (around 15 minutes) no longer support the time required to write the contents of the mainstore memory to a nonvolatile media, such as disk storage, for a controlled shut-down of many systems with large memories. The standard stand alone AC—AC UPS did not provide an effective power backup solution for many computer systems with a large memory, and a need existed for an improved method for providing backup power for system memory providing a continuously powered memory (CPM) function. The related copending application was designed to meet this need by providing a method and apparatus for providing backup power for a system memory, implemented in a modified uninterruptible power system (UPS) for a computer system to thereby provide a continuously powered memory CPM function.

The system according to the copending application, will now be described in more detail with reference to FIGS. 1 and 2. FIGS. 1 and 2 are block diagram representations of an exemplary computer or data processing system, and an embodiment of the power supply system of the copending application, respectively. A computer or data processing system is generally designated by the reference character 100. As shown in FIG. 1, the computer system 100 includes a central processor unit (CPU) 101, a read only memory 102, a random access memory or system mainstore memory 104, a display adapter 106 coupled to a display 108. The CPU 101 is connected to a user interface (UI) adapter 110 which is connected to a pointer device (and keyboard) 112. The CPU 101 is further connected to an input/output (I/O) adapter 114, which is connected to a direct access storage device (DASD) 116 and a tape unit 118. The CPU 101 is also connected to a communications adapter 120 providing a communications function with external devices and/or systems, for example.

With reference to FIG. 2, the power system according to an exemplary embodiment of the copending application, is designated generally by the reference character 148. The modified uninterruptible power supply (UPS) 150 includes an AC output and a DC output, an inverter circuit 166, one or more batteries 162, and an interface 154 to the system power supply 156. The inverter circuit 166 supplies AC power to the AC output of UPS 150. The at least one battery 162 supplies DC power to the DC output and to the inverter circuit 166. The control interface block 168 enables the inverter circuit 166 to initially supply AC power to the system power supply 156 via the AC output upon detection of a utility power loss and then, after a predetermined period of time, activates the DC output switch 164 to supply DC power to the system memory 104 via the system power supply 156, and disables the inverter circuit 166 to stop the initial supply of AC power to the system power supply 156.

The modified UPS 150 is connected to a panel and system power control network (SPCN) interface block 152 via the 26-pin UPS external interface connector 154, and to system power supply 156 and CPM voltage regulator 158 through this connector 154. A DC (direct current) voltage output from battery 162, e.g., +48V, is selectively fed into the power supply 156 via the 26-pin connector 154, in particular, to the CPM voltage regulator 158.

Regulator 158 selectively receives the DC voltage output from the modified UPS 150 and provides a set DC voltage output, such as a +3.3V output which is used to keep the system memory 104 powered during the time CPM is required. The +3.3V output of CPM voltage regulator 158 is applied to a first input of an OR block 160 connected to the system memory 104. A second 3.3 Volt input to the OR block 160 is provided by the system power supply 156 which normally supplies power to the system memory 104 when utility power is present. The CPM voltage regulator 158 provides power to the system memory 104 when utility power is lost, as will be described below.

As mentioned, the modified uninterruptible power supply (UPS) 150 includes one or more batteries 162 selectively providing the predetermined DC battery voltage output to the CPM voltage regulator 158, and this is done via a switch 164. The DC-to-AC inverter circuit 166 and the switch 164 are operatively controlled by the system power control function 152 using the control interface block 168 of the modified UPS 150.

During normal operation, a utility AC input to the modified UPS 150 is coupled by an OR functional block 170 to an AC input of the system power supply 156. Upon detection of a utility power loss, the modified uninterruptible power supply (UPS) 150 initially supplies AC power to the power supply 156 with the DC-to-AC inverter circuit 166, and then, after a predetermined period of time, for CPM shutdown preparation, stops supplying AC power, and instead supplies DC power to the system memory 104 directly from the battery 162, through the switch 164, the connector 154 and the CPM voltage regulator 158 of the system power supply 156. This DC power provides for continuously powering the memory, i.e., CPM.

The panel and system power control network (SPCN) determines when the predetermined period of time of utility power loss has elapsed, and then sends a DC On Command and an inverter Disable Command to the modified UPS 150 through interface 152 to control interface block 168. The external interface connector 154 is arranged to allow the use of the CPM shutdown capability with an external modified stand-alone uninterruptible power supply UPS configured for use as a CPM system. The modified UPS 150 is thus being used for CPM backup operation, and not traditional UPS functions.

The power system 148 is designed so that once a CPM control state is established by the system 100, all power can be removed from the system control circuitry. This makes essentially all power from the battery 162 available to memory 104. In addition, the power system 148 is designed so that its connecting cable connector 154 cannot be interrupted as a condition to turn on the DC output of UPS 150 via switch 164.

In operation, the system progresses through several operational states, which are now described. In state 1, the system 100 and modified UPS 150 are completely unpowered and inverter 166 is disabled, occurring at installation and any time utility power is removed after the system 100 is powered off, for example. Restoration of utility power causes a transition to state 2, where the modified UPS 150 has applied AC power to the system 100 with the system 100 turned off and inverter 166 disabled.

State 2 is the normal powered off state of the system 100. If a utility power failure occurs at state 2, the system 100 returns to state 1, the inverter 166 is not started, the DC output is not turned on, and the system 100 loses AC power. When the system is turned on in state 2, a transition to state 3 occurs, the normal powered on state of the system 100, where the modified UPS 150 is passing through AC and battery DC outputs of modified UPS 150 are turned off and the inverter 166 enabled.

When the system 100 is turned off in state 3, a transition to state 2 occurs. When a utility power failure occurs in state 3, which is signaled by a UPS utility failure signal, it causes a transition to state 4. In state 4, the system 100 is on and the modified UPS provides AC power to the system 100 with the inverter circuit 166, while the DC power from modified UPS 150 is off. If the utility power returns within a predetermined time period, for example within 30 seconds while in state 4, a transition back to state 3 occurs.

If the utility power is not restored within the predetermined time period, the system 100 makes a transition to either state 1(OFF) or a state 5. The system 100 makes a transition to the state 1 when conditions require a power off disabled so that the DC output will not be started. Otherwise, when conditions permit a power off enabled, the system 100 makes a transition to state 5 where the modified UPS DC power is turned on and applied to the CPM regulator 158 of the power supply 156.

In state 5, the inverter circuit 166 is off so that no AC power is provided to the system 100 and the interface signals are controlled by pull down resistors, as in state 1. The modified UPS 150 shuts down its logic to maximize the energy available to the system 100, with the DC output providing power to maintain the contents of the system memory 104, i.e., CPM operation.

Restoration of utility power in state 5 causes a transition to state 6. In state 6, the modified UPS 150 powers on and applies AC power to the already powered off system 100. Since the system 100 may remain powered off indefinitely, state 6 may exist indefinitely. The DC output of modified UPS 150 is maintained active to keep the system memory 104 powered. In state 6, modified UPS 150 maintains the DC output by utilizing the restored utility power for charging the battery 162.

The system power control network interface 152 determines that CPM is enabled in state 6 and the DC on interface signal is maintained in its default active state, so the modified UPS 150 does not turn off the DC output to CPM regulator 158. However, if a utility power failure occurs while in state 6, system 100 makes a transition to the state 5.

The normal transition from state 6 to state 3 results from a system power on operation. After the system 100 has successfully powered on and enabled the inverter circuit 166, the DC output is turned off and the memory 104 is powered by the normal operation of system power supply 156.

Connections for the 26-pin modified UPS external connector 154 are defined as follows in Table 1 below:

TABLE 1

| Position | Description |
| --- | --- |
| 1,2 | +48 VDC CPM |
| 3,5 | Gnd |
| 4 | N/C |
| 6 | −UPS Bypass |
| 7 | −UPS Battery Low |
| 8 | −UPS On |
| 9 | −UPS Utility Fail |
| 10,11 | +48 VDC CPM |
| 12,15 | Gnd |
| 13 | N/C |
| 14 | +Battery Test |
| 16 | −DC On |
| 17,19 | Gnd |
| 18 | +Inverter enabled |
| 20,21 | Gnd |
| 22 | −Status Bit 1 |
| 23,25 | Gnd |
| 24 | −Status Bit 2 |
| 26 | −Status Bit 3 |

Exemplary logical interface outputs are shown as follows in Table 2:

TABLE 2

| | |
| --- | --- |
| −UPS Bypass Active | no connect or inactive |
| −UPS On | grounded in the UPS 150 to indicate a UPS is present |
| −Battery Low | a low level indicating the battery 162 may not contain sufficient energy to sustain a two minute AC outage |
| −Utility Failure | a low level indicates utility power has been lost and the UPS 150 is providing energy from its batteries 162 via the inverter circuit 166 |

Exemplary logical interface status bit (1–3) outputs providing encoded to the system 100 are shown as follows in Table 3:

TABLE 3

| State | Description |
| --- | --- |
| 000 | UPS Normal, Inverter Enabled |
| 001 | Battery Test Accepted |
| 010 | Battery Test Rejected |
| 011 | CPM defective |
| 100 | UPS Battery Defective |
| 101 | UPS Defective |
| 110 | overload |
| 111 | UPS Normal, Inverter Disabled |

Exemplary logical interface status inputs are shown as follows in Table 4:

TABLE 4

| | |
| --- | --- |
| +Inverter Enabled | A high level enables the UPS to provide AC to the using system at the next loss of utility power. A low level causes the UPS to disable the inverter so that AC is removed or can not be provided to the using system from the batteries. |
| −DC On | A high to low transition on this signal while +Inverter Enabled is active, activates the DC output (+48v) of the UPS. |
| +Battery Test Request | A high level request to the UPS to perform a battery test. |

As mentioned above, systems such as the AS/400 computer system benefit from a Continuously Powered Memory (CPM) backup system when memory sizes reach a point where a conventional UPS cannot backup the system while all changed pages are written to permanent storage. This type of backup system was initially added in the form of an integrated battery backup system, described above, that provided full backup for 2 minutes while the software prepared the system for CPM and then 48 hours of backup for the memory only. The modified UPS power system providing CPM backup functionality was developed and disclosed in the copending application, referenced above.

However, a need exists for an enhancement to the previously described solutions which could combine both typical/standard UPS functions and the CPM functions described above, in one external stand-alone piece of equipment. This would provide both the CPM operation and standard UPS operation without the need of having both the integrated CPM functionality in one device, and an additional external UPS device.

Further, as noted above, in the industry standard UPS there is a so called fuel gauge capability which gives an indication of the run time remaining at current load so that equipment can anticipate when a total loss of power will occur. However, in the computer systems such as those described above, a need exists for both a period of UPS run time, and also a period of continuously powered memory (CPM) operation. The typical standard UPS fuel gauge function, however, does not take both of these two factors, UPS run time and CPM, into consideration.

Therefore, a need exists for an integrated UPS and CPM power system which provides a fuel gauge function that takes both UPS and CPM operation times into consideration.

SUMMARY OF THE INVENTION

It is, therefore, a principle object of this invention to provide a method and apparatus for implementing an integrated uninterruptible power supply (UPS) and continuously powered memory (CPM) backup system.

It is another object of the invention to provide a method and apparatus that solves the above mentioned problems.

These and other objects of the present invention are accomplished by the method and apparatus disclosed herein.

Advantageously, both UPS and CPM functions are provided within a single piece of hardware according to the present invention. This has particular applicability to computer systems requiring power backup for continuously powered system components.

According to another aspect of the invention, a function to track the amount of charge remaining in the battery, i.e., the so-called battery fuel gauge, is implemented taking into account both UPS and CPM requirements. CPM operation requires sufficient power to run the system at full load while the system is prepared for CPM shutdown, for example for 2 minutes, and then sufficient power to maintain memory for 48 hours, for example. Therefore, the fuel gauge operation indicates when the remaining energy reaches a threshold required for CPM, after some period of UPS operation.

This solution takes advantage of additional capacity which may be present depending on how many batteries a user elects to provide with the integrated UPS/CPM backup system. The backup system will determine how much additional capacity is present over what is required to support CPM. The additional capacity will be used to support traditional UPS function, e.g., extended ride-through time.

To use and control the additional capacity, the UPS/CPM backup system is connected to the system it is backing up, e.g., an AS/400 computer system, by two separate connections. One connection supporting traditional UPS operations and the other supporting CPM operations. For example, a 9-pin connection is used for the traditional UPS functions and a 26-pin connection is used for the CPM functions.

Advantageously, the 9 pin connection is the above described connection between UPS and the AS/400 computer system to support traditional UPS operation, while the 26 pin connection is the interface design disclosed herein and in the copending application referenced above, to support CPM operation.

According to an aspect of the invention, when a utility failure occurs, the UPS/CPM backup system according to the invention signals utility failure on the standard 9 pin interface, as long as the charge remaining in the battery at that point is more than sufficient to support CPM operation. By signaling utility failure on the 9 pin interface, the AS/400 System Power Control Network (SPCN) will signal the operating system and the customer can use all the existing support for UPS operation to control system operation. That is, the system values for UPS delay time apply and the messages to user programs for UPS event handling will get generated.

If the utility failure persists to the point that the batteries are discharged so that only sufficient charge remains to support CPM, the UPS will signal utility failure on the 26 pin interface as well. At that point, SPCN will again signal the operating system, but this time in a way to invoke a CPM shutdown. This signaling of CPM shutdown will preempt any other, e.g., standard UPS, recovery underway, and the system will be put into a CPM shutdown.

Advantageously, this aspect of the invention allows the use of a single backup system to provide both normal standard UPS operation, controlled by user settable system values, and also a fail safe CPM backup operation.

According to a further aspect of the invention, the fuel gauge indication which takes both UPS and CPM into consideration, provides the mechanism to instigate a CPM backup when the energy remaining is only sufficient to guarantee CPM backup. In other words, the CPM backup is automatically invoked when the battery capacity is not sufficient to provide the UPS operation selected by the UPS system values, based on the fuel gauge indication.

According to a further aspect of the invention, the fuel gauge function is dynamic in that the time to reach the threshold value of remaining energy for CPM is dependent on the current state of charge of the batteries and the current system load, that is, the energy being drawn by the system at the present point in time, which are taken into account in the fuel gauge. Because the system load is dependent on what hardware is present and operating at a given point in time, and because the system load and the state of charge of the batteries, etc., may change with time, the fuel gauge function is, in this sense, dynamic. Optimum battery energy use is achieved in this way.

Besides the current system load, the threshold determination may be based, for example, on the current state of charge of the batteries, the performance the batteries are capable of, i.e., the amp-hours at particular voltages, whether they have been fully charged, the battery charge time, and/or other characteristics of the UPS/CPM backup system. These factors are used to calculate when the CPM threshold is reached. In the prior UPS systems, the fuel gauge calculation only predicted the time before complete battery failure. For the present invention, the fuel gauge calculation is altered to predict the time when the CPM threshold is reached, that is, the point at which there is only sufficient energy remaining to safely provide for the CPM shutdown, e.g., two minutes of CPM preparation and two days of providing continuous power to maintain the memory contents.

According to another aspect of the invention, a user can implement both UPS/CPM backup, UPS only backup, or CPM only backup support, by connecting either one of the 9 pin and 26 pin connections, or both connections to the system being backed up.

These and other aspects and advantages of the invention will become clear from the following detailed description.

DETAILED DESCRIPTION OF THE PREFERRED EMBODIMENT

The invention will now be described in more detail by way of example with reference to the embodiment shown in the accompanying figures. It should be kept in mind that the following described embodiment is only presented by way of example and should not be construed as limiting the inventive concept to any particular physical configuration.

As previously noted, according to the present invention, the functionality of a standard industry UPS and the functionality of a CPM backup system are advantageously combined into a single device, referred to herein as a UPS/CPM backup system. To accomplished this, the modified UPS providing CPM operation, which was previously described above and which is the subject matter of the copending application, is changed in two fundamental ways.

In particular, a 9 pin standard UPS interface is provided on-board in addition to the 26 pin CPM interface, both already described above. Further, a fuel gauge capability, which is a standard part of many industry UPS systems, is modified so that its threshold of "warning" is changed from the normal "low battery shutoff" indication, i.e., complete battery failure, to the threshold energy requirements of integrated UPS/CPM support.

Regarding the latter, the typical industry UPS "fuel gauge" capability indicates the run time remaining at a current load to battery failure, i.e., a low battery shutoff warning. This warning is provided so that the using equipment can anticipate the time to a total loss of power, and take appropriate precautionary measures. However, in systems with large memories, such as models of the AS/400 computer system, since the typical UPS cannot provide a long enough run time to store memory contents to permanent storage, this standard fuel gauge warning was not useful.

According to the invention, the standard UPS is modified so that the fuel gauge warning threshold is not the typical battery shutoff criteria, but instead is what has been referred to herein as the CPM threshold, i.e., the threshold at which there is only an amount of energy that is sufficient to hold the system at the current load for 2 minutes during which CPM preparation can complete, plus a predetermined amount which is sufficient to hold the system memory for an additional 48 hours (minimum). This solution takes advantage of additional capacity which may be present depending on how many batteries a user elects to provide with the integrated UPS/CPM backup system. The backup system determines how much additional capacity is present over what is required to support CPM. The additional capacity can be used to support traditional UPS function, e.g., extended ride-through time.

Figure 1:
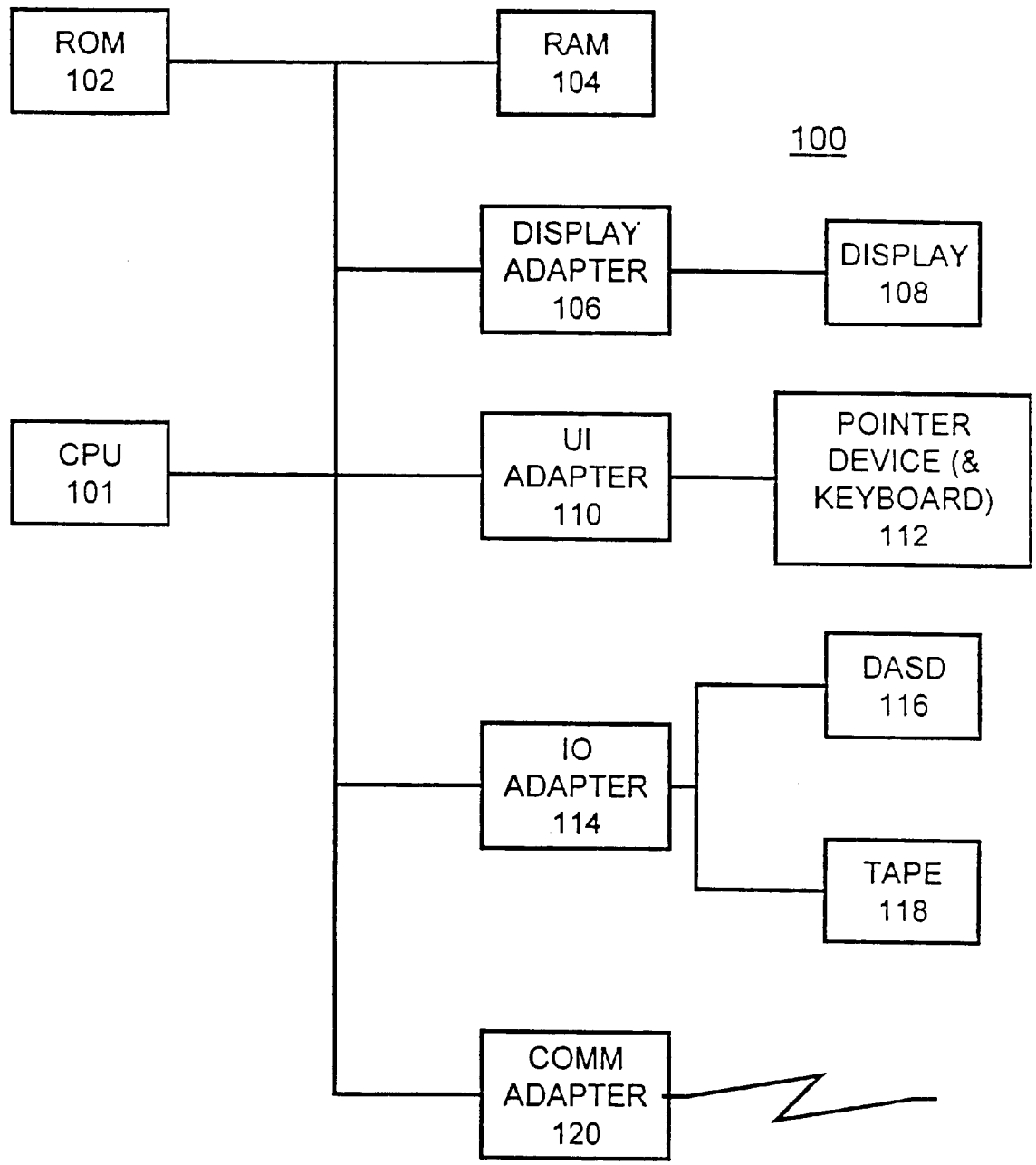
FIG. 1 is a block diagram representation of a computer or data processing system with which a backup power system could be used.
Figure 2:
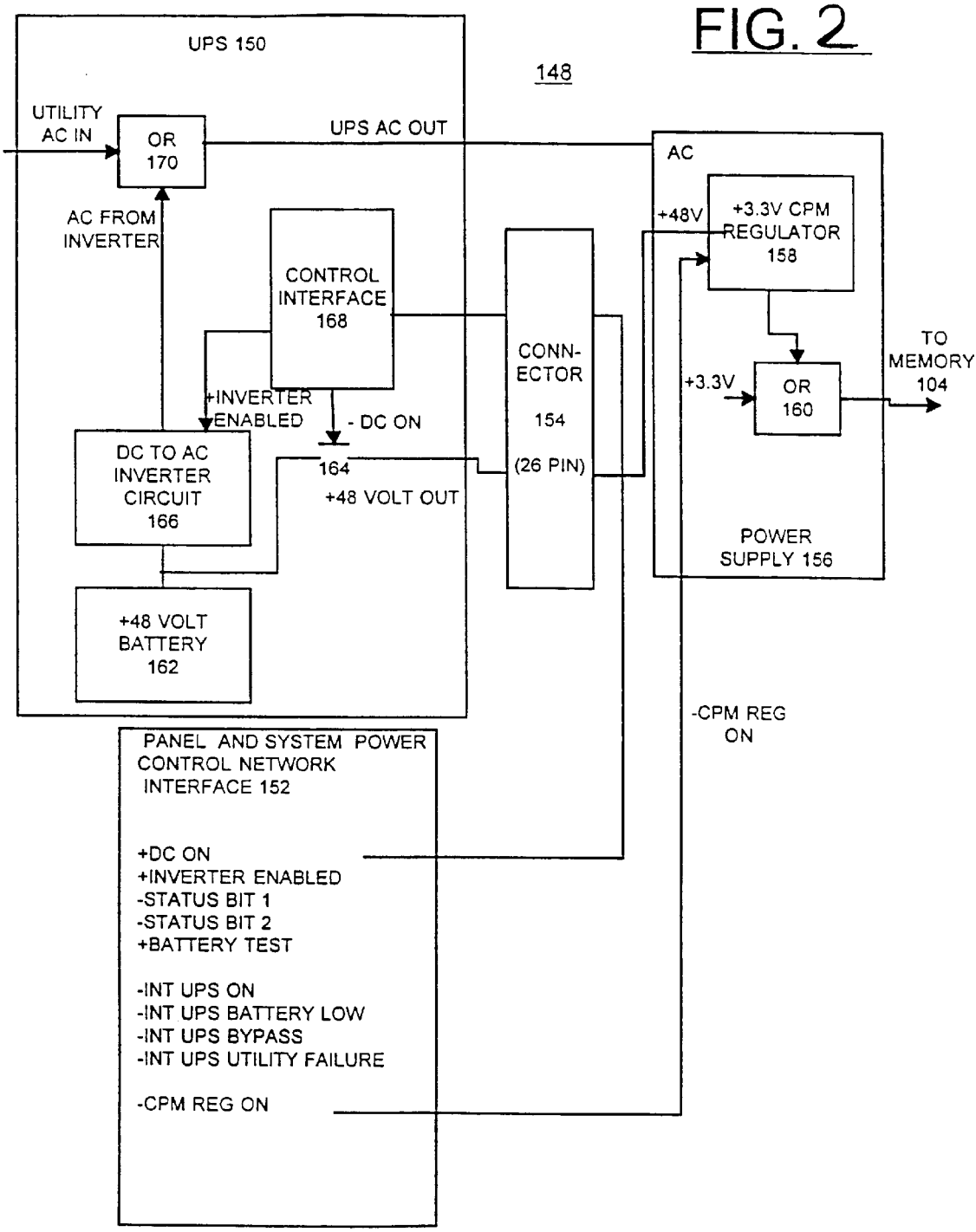
FIG. 2 is a block diagram of the modified UPS providing a CPM backup power system of the copending application.
Figure 3:
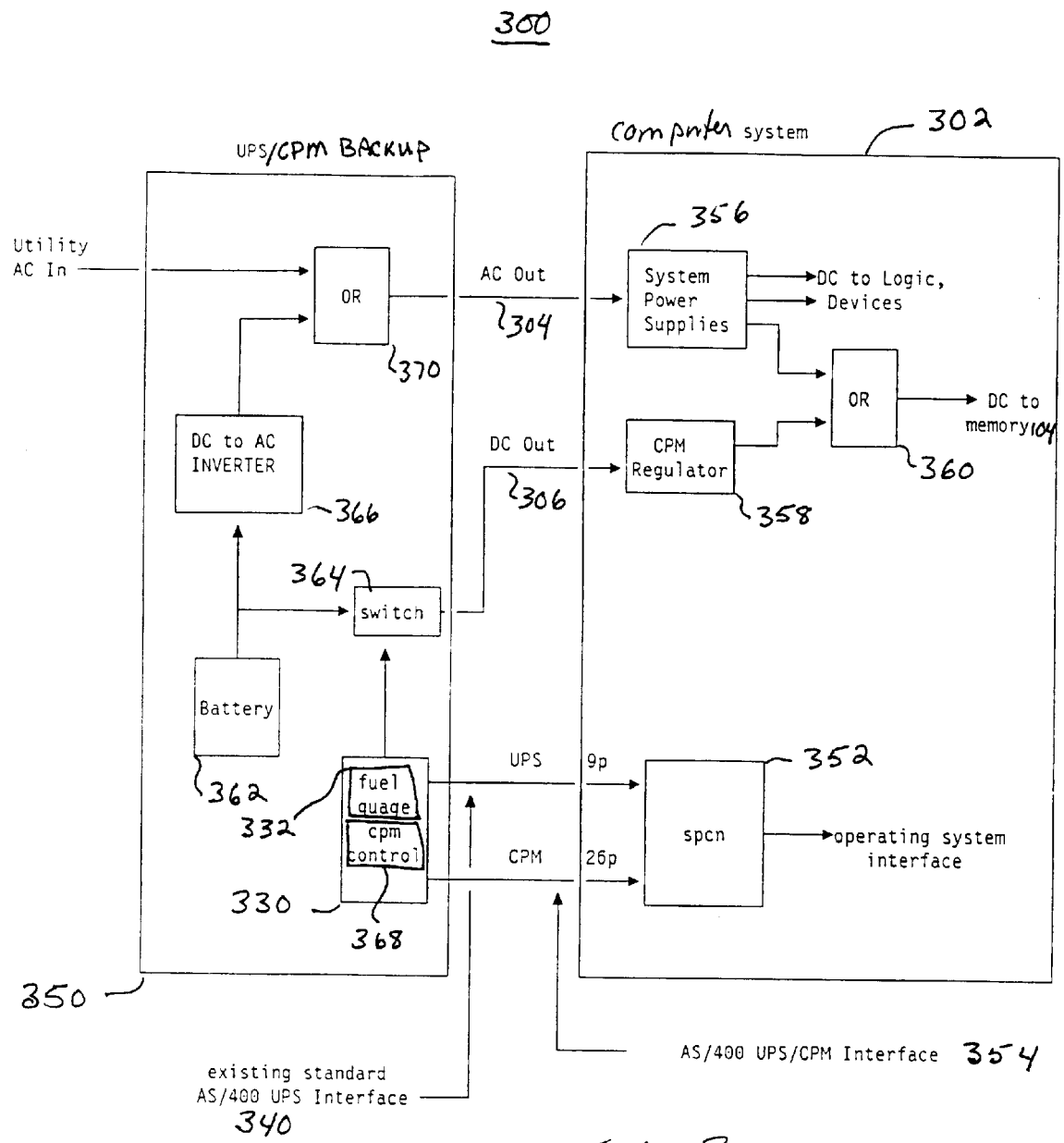
FIG. 3 is a block diagram of an exemplary embodiment of a power system according to the invention, incorporating standard UPS and CPM backup power functionality, and including a modified fuel gauge.

With reference to FIG. 3, an embodiment of a UPS/CPM backup system 350 according to the invention is connected to a computer system 302 to provide backup power. Utility AC is provided to the UPS/CPM backup 350 and through an OR block 370, to an AC out line 304 which connects to system power supplies 356 of the computer system 302. The UPS/CPM backup 350 includes one or more batteries 362 which provide backup AC power when there is a utility failure, through DC to AC inverter 366 and the OR block 370, and provide CPM DC power through switch 364 and DC out lines 306. Switch 364 is controlled by controller block 330 which contains both the CPM control block 368 and a modified fuel gauge block 332. The CPM control 368 operates in substantially the same manner as previously described with respect to FIG. 2, to control the inverter 366 and switch 364 when CPM backup operation is to be instigated. A difference is that the CPM operation will be instigated based on the fuel gauge 332 determination that the CPM threshold has been reached. By CPM operation is meant providing AC to the system for about 2 minutes of CPM preparation, and then providing DC output for around 48 hours (minimum) to keep the data stored in system memory from being lost. The CPM threshold is the point at which the energy remaining in the battery 362 is just sufficient to provide for the CPM operation, i.e., the 48 hours and 2 minutes just described.

In the illustrated embodiment, the backup system 350 is provided with a CPM interface 354, i.e., a 26 pin interface as disclosed in the copending application, and a "standard" UPS interface 340, i.e., a 9 pin interface. When a utility failure occurs, the UPS/CPM backup system according to the invention signals utility failure on the standard 9 pin interface, as long as the charge remaining in the battery at that point is more than sufficient to support CPM operation. By signaling utility failure on the 9 pin interface, the AS/400 System Power Control Network (SPCN) will signal the operating system and the user can use all the existing support for UPS operation to control system operation. That is, the system values for UPS delay time apply and the messages to user programs for UPS event handling will get generated.

The modified fuel gauge 332 capability is illustrated as provided in the UPS/CPM backup system 350. The computer system 302 can now handle utility failure status based on signals provided on both the 9 pin 340 and 26 pin 354 interfaces in the following exemplary manner. As mentioned, when a utility failure occurs, the UPS/CPM backup system 350 reports "utility failure" on the 9 pin interface. This signal is passed to the operating system where a timer is started. The "qupsdlytim" system parameter is examined and if the utility failure persists beyond the value of this parameter, a standard UPS system shutdown is started, i.e., changed pages are written to permanent storage, e.g., DASD.

However, if at the time of the outage, or at any time later, the UPS/CPM batteries 362 are depleted to their point where the CPM warning threshold as indicated by the fuel gauge 332 is reached, then the UPS/CPM 350 also signals "utility failure" on the 26 pin CPM interface. This signal is also sent to the operating system which preempts ANY other processing and proceeds with the preparations for a CPM power off. That is, if the utility failure persists to the point that the batteries are discharged so that only sufficient charge remains to support CPM, the UPS will signal utility failure on the 26 pin interface as well.

This is an advancement over the previously described systems for at least the following reasons. The "shutdown" initiated by normal UPS support is the preferred way to suspend system operation because all changed data in memory is written to its non-volatile location on disk storage (DASD). This "write changed pages shutdown" is now permanently non-volatile. On the other hand, the CPM power off is a compromise when there is not sufficient time to complete a "write changed pages shutdown". It is desirable because the penalty for not completing a "write changed pages shutdown" may severely extend system restart time.

As may be appreciated, the advantages to the user of this design are several. In one piece of equipment, the user gets the functions of a UPS with user alterable system parameters. This allows the user to purchase additional batteries to provide more ride-through than is provided with the relatively short fixed ride-through, e.g., 30 seconds of the 2 minutes of time referred to above as the CPM preparation time, incorporated in the CPM backup mechanism. Further, the user gets the benefit of a dynamic fuel gauge that "kicks in" the CPM backup support when the energy remaining is only sufficient to guarantee CPM backup. By dynamic is meant that the time to reach the threshold is dependent on the current state of charge and the current system load. This works to make optimum use of battery energy, while also providing protection for run time calculations which can only be made assuming fully charged batteries and fixed maximum load.

Further, the UPS/CPM may be used to only provide standard UPS backup, only provide CPM backup, or to provide both. Advantageously, this capability is enabled by connecting one or both of the 9-pin and 26-pin interfaces between the UPS/CPM backup system and the computer system, e.g., AS/400.

For example, the user does not have to use the normal UPS shutdown function. In this case, the user would simply not connect the 9-pin cable. In this situation, the user automatically gets the benefit of increased-ride through because the system is not notified of a utility failure until it is signaled on the 26-pin interface. Consequently, the excess energy of the batteries is used to attempt to ride-through the outage before starting the irreversible process of CPM shutdown, i.e., the normal write changed pages shutdown is bypassed. This might be useful where utility failures typically occur frequently and/or require varying ride-through times, but do not generally exceed the ride-through capacity of the UPS/CPM batteries to the point where CPM shutdown is initiated.

Alternately, the user may prefer the "write changed pages" type of shutdown which is provided by connecting the 9-pin cable and setting the "qupsdlytim" system parameter (mentioned above) to an appropriate value. If the 26 pin cable is also connected in this situation, the CPM capability functions as a secondary backup "fail-safe" mechanism that will provide protection if for some reason there is not sufficient energy in the UPS batteries when the outage occurs to complete a normal write changes pages shutdown.

The typical 2 minute CPM shut down includes 30 sec for ride-through (to see if power restored before going further) and then 90 seconds to prepare the system. The 90 seconds is irreversible, i.e., once started, the system is going to power off even if the utility AC is restored. The CPM preparations involve completing I/O operations, stopping tasks at convenient boundaries, etc., and finally purging the cache to mainstore memory. The cache, as part of the processor, will lose power at power off and therefore, its contents would otherwise be lost.

The UPS/CPM determines dynamically how much energy is required for the 2 minutes of preparation by measuring the current system load, and considering the operating state and characteristics of the batteries, etc., as mentioned earlier. However, the exact amount necessary to hold just the memory for 48 hours cannot generally be determined precisely by measurements made by the UPS/CPM. This value is predetermined based on the characteristics and amount of the memory in the system to be backed up, and therefore is provided to the UPS/CPM fuel gauge in advance so that it is stored therein and included in the fuel gauge calculations. To avoid a loss of memory contents, the conservative approach is to use a maximum value expected. If for any reason, system memory is expanded or changed resulting in a larger or smaller required energy for CPM backup, then the fuel gauge calculations are modified with the required value to support the changed memory.

Advantageously, no modifications to the existing 26-pin and 9-pin interfaces described above are needed to implement the present invention. This is accomplished by specifying under what conditions the "utility failure" signal in the 26 pin interface is activated, that is, when the CPM threshold is reached in battery energy according to the fuel gauge function.

Although the preferred embodiment of the present invention described as implemented using the 26-pin CPM interface described above along with the standard 9-pin UPS interface for compatibility with existing systems, it is not necessarily limited to this arrangement. For example, a standard RS-232 interface could be used in place of the CPM 26-pin interface to provide the status information and control signals between the UPS/CPM and the system being backed up.

Further, the functions provided by the 9 pin and 26 pin interfaces could be combined into a single interface, and system parameters used to select the type of shutdown desired. Such modifications are considered to be within the spirit of the invention.

Figure 4:
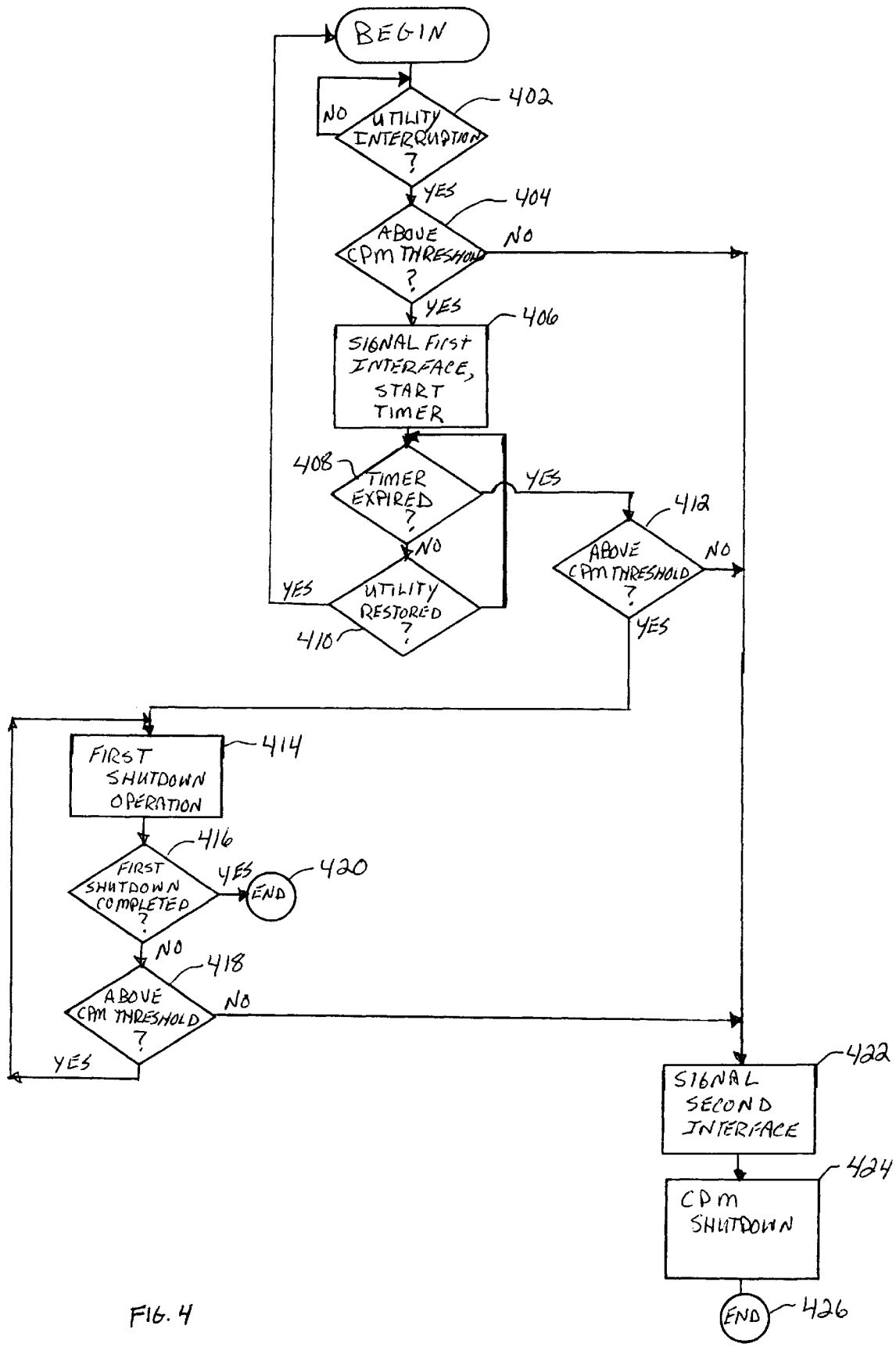
FIG. 4 is a flow chart of an exemplary method according to an embodiment of the invention.

FIG. 4 is a flow chart for an exemplary method according to an embodiment of the invention. Upon detection of a utility interruption at block 402, a ride-through timer is started and alternating current is provided to the computer system, i.e., the traditional UPS, provided the battery is above the CPM threshold (blocks 404 to 406). If utility power is not restored before the timer has expired (blocks 408 to 410), then either a first or a second shutdown operation will be started, again depending on whether the battery is still above the CPM threshold (block 412).

If the CPM threshold has not been reached, then a first shutdown operation is started (block 414). As long as the battery energy remains above the CPM threshold, the first shutdown operation will proceed to completion (blocks 416, 418 and 420). However, should the threshold be reached, the first shutdown operation will be haulted and a CPM shutdown procedure started (blocks 422 to 426).

If at any time after a utility interruption has been detected (block 402) the battery state reaches the CPM threshold (blocks 404, 412, or 418), the CPM shutdown operation will be started, preempting any other operations that may be taking place. Further, in the preferred embodiment, once a CPM shutdown has been started, the computer system will progress to the end of the shutdown process whether or not utility power has been restored in the meantime, in order to avoid the possibility of errors that could occur due to a partially completed shutdown process.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

What is claimed is:

1. A backup power system having an alternating current output and a direct current output, for use in providing backup power to an electronic device when power from a utility is interrupted, comprising:

at least one battery;

an inverter coupled to the at least one battery and selectively providing alternating current to the alternating current output of the backup power system;

a switch for selectively coupling the at least one battery to the direct current output of the backup power system;

at least one communication interface for connection to the electronic device; and a controller coupled to control operation of the switch and the inverter, and to the at least one battery to measure energy stored therein, the controller providing output information for use by the electronic device through the at least one communication interface;

wherein, in the event of an interruption of utility power:
if the amount of energy stored in the at least one battery is above a threshold amount, the controller controls the inverter of the backup power system to provide alternating current to the alternating current output of the backup power system, and
if and when the amount of energy stored in the at least one battery is not above the threshold amount, the controller controls the inverter of the backup power system to provide alternating current to the inverter of the alternating current output for a predetermined limited period of time, and then controls the switch to provide direct current to the direct current output of the backup power system;

wherein the threshold value is an amount of energy required for providing the alternating current output to the electronic device for the predetermined limited period of time during which the electronic device prepares for a low-powered mode, followed by the direct current output to the electronic device during which the electronic device is in the low-powered mode.

2. The backup power system according to claim 1, wherein the at least one communication interface comprises a first interface and a second interface;
wherein the first interface is for use by the controller to indicate to the electronic device the occurrence of a utility interruption; and
wherein the second interface is for use by the controller to indicate to the electronic device the occurrence of a utility interruption when the measured amount of energy stored in the at least one battery is not above the threshold amount.

3. The backup power system according to claim 2, wherein the electronic device is a programmed computer having memory and non-volatile storage, the computer being coupled to both the first and second interfaces, and wherein:
when the occurrence of a utility interruption is indicated to the computer on the first interface, the computer is supplied with alternating current by the backup power system while the computer performs a first shutdown operation including writing information stored in memory to non-volatile storage; and
when the occurrence of a utility interruption is indicated on the second interface, the computer stops the first shutdown operation if the first shutdown operation is in progress, the computer is supplied with alternating current by the backup power system for a limited period of time during which the computer performs a second shutdown operation in preparation for the low-powered mode, and then the backup power system provides direct current to the computer to maintain information stored in memory in the low-powered mode.

4. The backup power system according to claim 1, wherein the at least one communication interface comprises a first interface and a second interface;
wherein the first interface is for use by the controller to indicate the occurrence of a utility interruption to the electronic device; and
wherein the second interface is for use by the controller to indicate the occurrence of a utility interruption to the electronic device when the measured amount of energy stored in the at least one battery is not above the threshold amount.

5. The backup power system according to claim 4, wherein the electronic device is a programmed computer having memory, wherein:

the computer is connected to the second interface and is unconnected to the first interface;

when a utility interruption occurs, the backup power system provides alternating current to the computer if the measured amount of energy stored in the at least one battery is above the threshold amount; and when the occurrence of a utility interruption is indicated on the second interface, the backup power system provides alternating current to the computer for a limited period of time during which the computer performs a shutdown preparation operation in preparation for the low-powered mode, and then direct current is provided to the computer by the backup power system to maintain information stored in memory in the low-powered mode.

6. The backup power system according to claim 4, wherein the electronic device is a programmed computer having memory and non-volatile storage, the computer being coupled to both the first and second interfaces, wherein:

when the occurrence of a utility interruption is indicated to the computer on the first interface, the computer is supplied with alternating current by the backup power system while the computer performs a first shutdown operation including writing information stored in memory to non-volatile storage; and when the occurrence of a utility interruption is indicated on the second interface, the computer stops the first shutdown operation if the first shutdown operation is in progress, the computer is supplied with alternating current by the backup power system for a limited period of time while the computer performs a second shutdown operation in preparation for the low-powered mode, and then direct current is provided to the computer by the backup power system to maintain information stored in memory in the low-powered mode.

7. The backup power system according to claim 1, wherein the at least one communication interface is for use by the controller to indicate the occurrence of a utility interruption to the electronic device when the measured amount of energy stored in the at least one battery is not above the threshold amount.

8. The backup power system according to claim 7, wherein the electronic device is a programmed computer having memory, and wherein, when the occurrence of a utility interruption is indicated to the computer on the at feast one interface, the backup power system provides alternating current to the computer for a limited period of time during which a shutdown operation is performed in preparation for the low-powered mode, and then the backup power system provides direct current to the computer to maintain information stored in memory in the low-powered mode.

9. The backup power system according to claim 1, wherein the threshold value is based on operating characteristics of the backup power system and the electronic device being backed up.

10. A method of operating a backup power system for an electronic device, the backup power system having at least one battery, the method comprising:

detecting the occurrence of a utility interruption;

detecting whether an amount of energy present in the at least one battery is above a threshold value;

when a utility interruption is detected and the detecting determines that the amount of energy present in the at least one battery is above the threshold value, providing alternating current to the electronic device;

when a utility interruption is detected and the detecting determines that the amount of energy present in the at least one battery is not above a threshold value, providing alternating current to the electronic device for a predetermined limited period of time, and then providing direct current to the electronic device;

wherein the threshold value is an amount of energy required for providing the alternating current output to the electronic device for the predetermined limited period of time during which the electronic device prepares for a low-powered mode, followed by the direct current output to the electronic device during which the electronic device is in the low-powered mode.

11. The method according to claim 10, wherein the backup power system includes at least one interface for connection to the electronic device, the method further comprising:

indicating the occurrence of a utility interruption to the electronic device.

12. The method according to claim 10, wherein the backup power system includes a first interface and a second interface, the first and second interfaces for connection to the electronic device, the method further comprising:

indicating the occurrence of a utility interruption to the electronic device on the first interface when the amount of energy present in the at least one battery is above the threshold value; and indicating the occurrence of a utility interruption to the electronic device on the second interface when the amount of energy present in the at least one battery is not above the threshold value.

13. The method according to claim 12, wherein the electronic device is a programmed computer having memory and non-volatile storage, the method further comprising:

performing a first shutdown operation when an indication of the occurrence of a utility interruption is received from the backup power system by the computer on the first interface; and performing a second shutdown operation when an indication of the occurrence of a utility interruption is received from the backup power system by the computer on the second interface;

wherein the first shutdown operation includes writing information stored in memory to non-volatile storage while alternating current is provided to the computer by the backup power system; and wherein the second shutdown operation includes preparing for shutdown while alternating current is provided to the computer by the backup power system, and maintaining memory contents while direct current is provided to the computer by the backup power system.

14. The method according to claim 13, further comprising:

starting a timer when the occurrence of a utility interruption is detected; and waiting for the timer to expire before starting the first or the second shutdown operations.

15. The method according to claim 10, wherein the threshold value is also based on operating characteristics of the backup power system and the electronic device being backed up.

* * * * *